COMPONENT LEAD CLINCHING DEVICE

Filed Feb. 23, 1967

INVENTORS,
ROBERT F. WELCH
PHILLIP A. RAGARD

BY Fidelman & Wolffe
ATTORNEYS

INVENTORS
ROBERT F. WELCH
PHILLIP A. RAGARD

BY Fidelman & Wolffe
ATTORNEYS

INVENTORS,
ROBERT F. WELCH
PHILLIP A. RAGARD
BY Fidelman & Wolffe
ATTORNEYS

United States Patent Office 3,435,857

Patented Apr. 1, 1969

3,435,857

COMPONENT LEAD CLINCHING DEVICE

Phillip A. Ragard, Binghamton, N.Y., and Robert F. Welch, Susquehanna, Pa., assignors to Universal Instruments Corporation, Binghamton, N.Y., a corporation of New York Filed Feb. 23, 1967, Ser. No. 617,870
Int. Cl. B21f *15/04, 45/00*
U.S. Cl. 140—71 9 Claims

ABSTRACT OF THE DISCLOSURE

A device for clinching leads of electrical components to a board, which leads are connected to the body portion of the component disposed on one side of the board and extend through the board and project outwardly from the other side thereof; the device including a plurality of pivotably supported arms having lead deforming and guiding surfaces, which surfaces are adapted in sequence to be placed adjacent to the projecting leads and thereafter moved along an arcuate path to wipe the leads into clinching engagement with the board.

The component clinching device of the present invention is an improvement over the transistor clincher described in U.S. Patent 3,167,779. The clinching device of Patent 3,167,779 includes in combination a cylindrical outer anvil; a concentrically disposed cylindrical inner anvil; and a clamping rod disposed concentrically of the inner anvil. In operation the rod is reciprocated into engagement with the bottom or underside of a circuit board to force the board into firm engagement with the base of an inserted component, whereafter the inner and outer anvils are actuated in succession to bend and thereafter crimp the component leads.

It has been found that the clincher described in 3,167,779 can not be satisfactorily employed in those instances where the length of leads projecting from the bottom of a circuit board is relatively short, due either to the utilization of a relatively thick circuit board or of components having relatively short leads. Further, it has been found that the hammering action of the rod and anvils exerts excessive strain on the board and in some cases results in the breaking of one or more leads.

Accordingly, it is an object of the present invention to provide a clinching device which is particularly adapted to clinch short component leads without unduly stressing either the leads or the circuit board against which the leads are clinched.

These and other objects of the present invention will be more fully understood with reference to the following description taken with the accompanying drawings, wherein.

Figure 1:
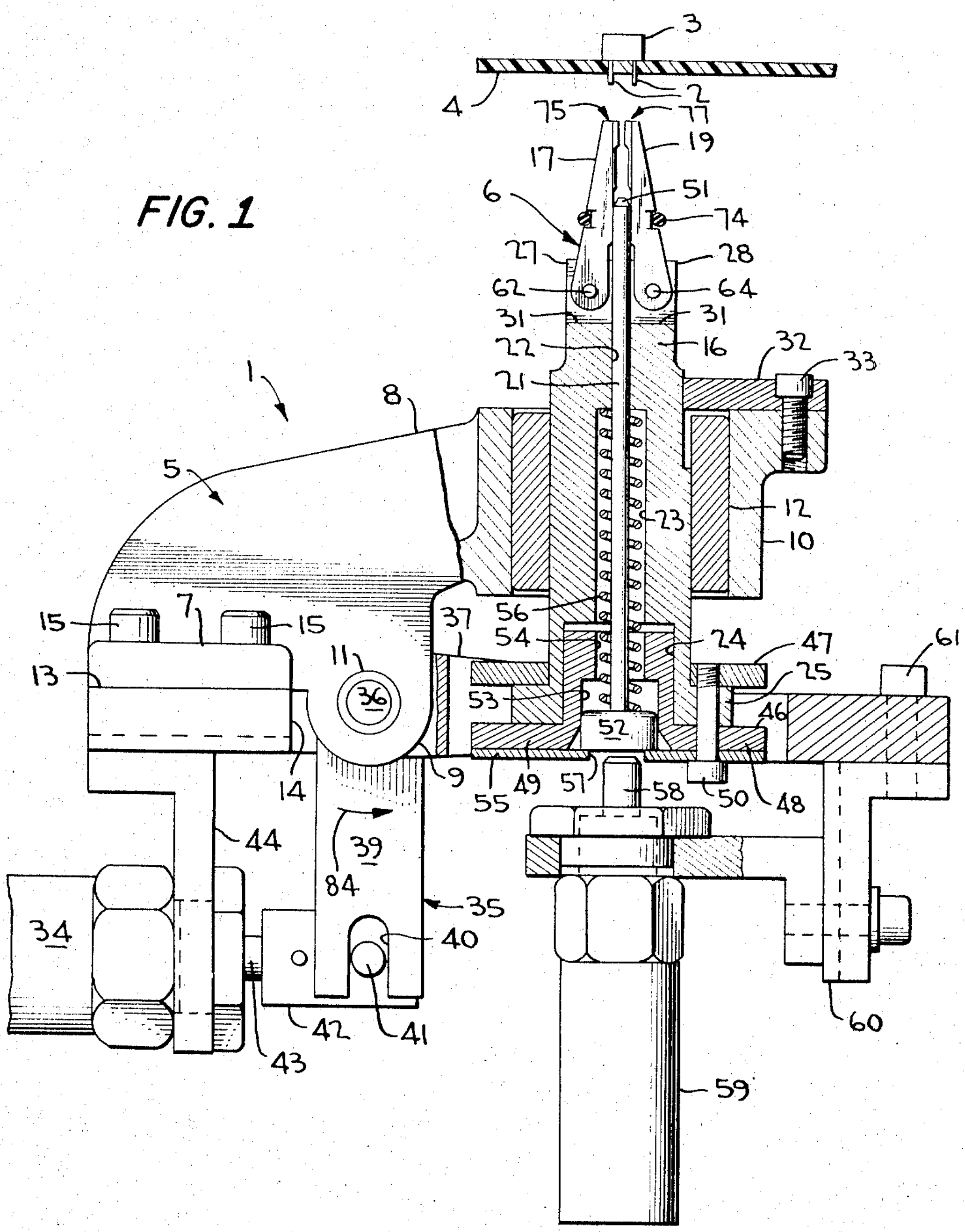
FIG. 1 is a side elevation view of a component lead clinching device of the present invention illustrating the actuating mechanism in partial cross-section.

The clinching device of the present invention, which is generally designated as 1 in FIG. 1, is adapted for use in clinching wire leads 2, which extend from the body portion 3 of an electrical component and project downwardly through a printed circuit board 4. For purposes of the present invention, any suitable means, not shown, may be employed to insert the component leads into the circuit board and thereafter maintain the underside of the component body portion in engagement with an upper surface of the circuit board during the clinching operation to be described. Further, it will be understood that any suitable means, not shown, may be employed to support the circuit board in the component receiving position illustrated.

Figure 2:
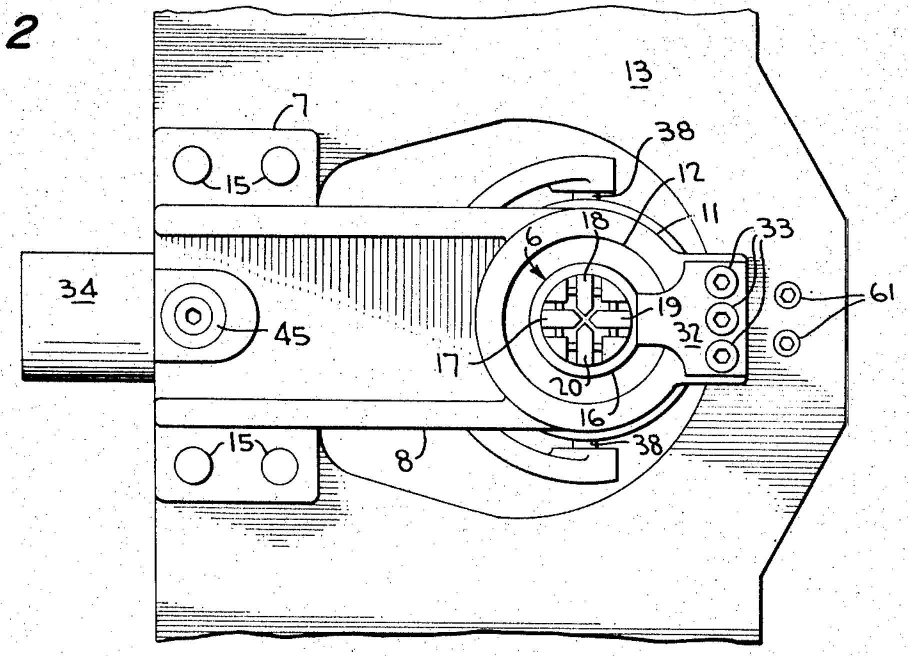
FIG. 2 is a top plan view of the lead clinching device of FIG. 1.

Clinching device 1 is shown in FIGS. 1 and 2 as including a main body section, generally designated as 5, and a clinching unit, generally designated as 6. Body section 5 is preferably formed from a metal casting having a horizontally extending base flange 7; a laterally extending arm portion 8, having a depending flange portion 9; and an enlarged head portion 10. As best seen in FIG. 1, depending flange 9 is bored to receive a horizontally extending cylindrical bearing 11, and enlarged head portion 10 is bored to receive a vertically extending cylindrical bearing 12. Body portion 5 may be mounted beneath circuit board 4 on a table 13 adjacent to table aperture 14 by any suitable means, such as bolts 15 which pass downwardly through body section base flange 7.

Figure 3:
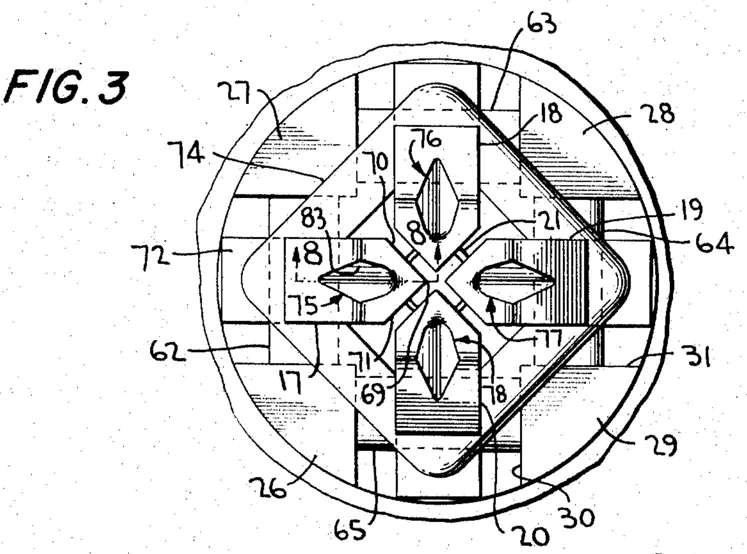
FIG. 3 is an enlarged view of the clinching arms shown in FIG. 2.

Clinching unit 6 is shown in FIGS. 1 through 3 as including a support block 16; a plurality of lead clinching arms 17, 18, 19 and 20; and a clinching arm actuating rod 21. Support block 16 is shown particularly in FIG. 1 as being in the form of a cylindrical casting having a vertically extending stepped bore opening comprising sections 22, 23 and 24; a radially extending base flange 25; and a plurality of pivot supports 26, 27, 28 and 29, which are defined, as best seen in FIG. 3 by a pair of mutually perpendicular transversely extending slots 30 and 31. Support block 16 is constrained for vertical reciprocating movement within bearing 12 by means of key 32, which is fixed to the body section enlarged head portion 10 by means of screws 33.

By referring to FIGS. 1 and 2, it will be seen that clinching unit 6 is supported for vertical movement with respect to body section 5 by means of a first fluid actuator 34 acting through a bell crank 35, which is pivotally supported on body section 5 by means of a pin 36 received within bearing 11. Bell crank 35 includes a semicircular yolk portion 37, which is adapted to be operatively connected to a clinching unit 6 by means of a pair of inwardly extending co-axial dowels 38, shown only in FIG. 2; and a pair of parallel rectangular plates 39, only one of which is shown in FIG. 1, which are joined at the upper ends thereof to a semi-circular yolk 37. Plates 39 are slotted adjacent the lower ends thereof, as at 40, to slidably receive a pin 41 which is mounted upon a block 42 carried on shaft 43 of fluid actuator 34. Actuator 34 may be supported below table 13 by any suitable means, such as bracket 44, which may be affixed to the underside of the table by means of screw 45, illustrated in FIG. 2.

It will be understood that dowels 38 are adapted to be movably received within a circumferentially extending groove 46, which is defined by support block base flange 25, ring member 47 and the radially extending flange portion 48 of a cup member 49, which is received within support block bore section 24. One or more screws 50 are employed to maintain cup member flange 48, support block flange 25 and ring member 47 in clamping engagement.

The body section, bell crank, and means of connecting the bell crank to the clinching unit are substantially identical in structure to corresponding elements of the clincher described in above mentioned U.S. Patent 3,167,-779 and reference may be made thereto for a more thorough description of specific design details.

Again referring to FIG. 1, it will be seen that clinching arm actuating rod 21 is slidably received within support block bore section 22, and is provided with a frustoconical upper end portion 51, which is adapted to operably engage clinching arms 17–20, and an enlarged cylindrical base portion 52, which is slidably received within the enlarged section 53 of the vertically extending stepped bore 54 provided in cup member 49. Actuating rod base portion 52 is normally retained in a down position in engagement with the plate 55 by means of a coil spring 56, which is received within support block bore section 23 and cup member bore 54. Plate 55 is apertured as at 57 and is normally retained in clamping engagement with cup member 49 by means of screw 50.

Figure 4:
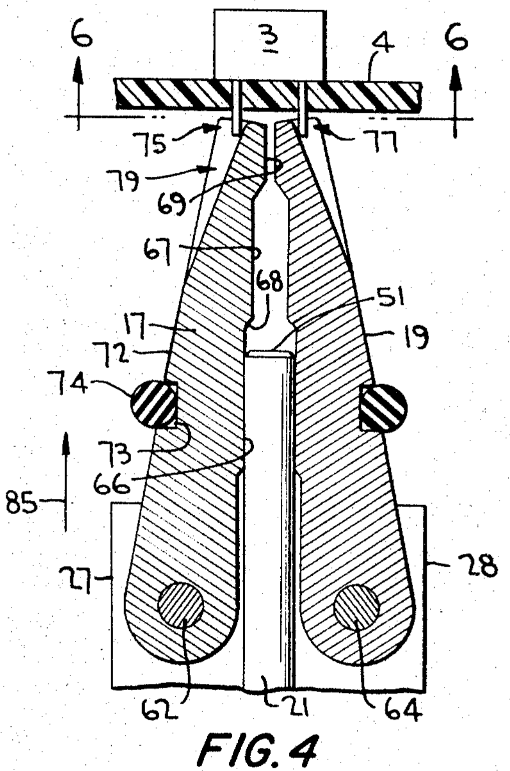
FIG. 4 is an enlarged cross-sectional view of the clinching arms shown in FIG. 1, but showing the arms in partially actuated position.
Figure 5:
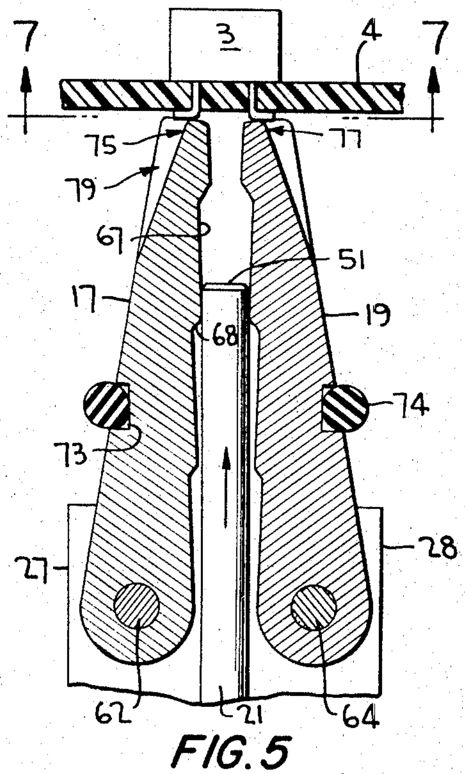
FIG. 5 is a view similar to FIG. 4 but showing the clinching arms in fully actuated position.
Figure 6:
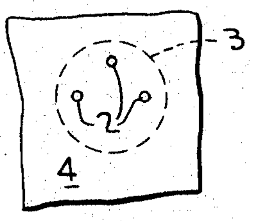
FIG. 6 is a view taken generally along the line 6—6 in FIG. 4.

Actuating rod 21 is adapted to be reciprocated upwardly with respect to clinching arms 17–20 from an initial or rest position, generally illustrated in FIGS. 1 and 4, into an actuating position, generally illustrated in FIG. 5, by piston rod 58, which is adapted to be propelled upwardly through plate aperture 57 into engagement with actuating rod base portion 52 by means of a second fluid actuator 59. Fluid actuator 59 may be supported below table 13 by means of the bracket arrangement, generally indicated at 60, which may be suitably affixed to table 13, as by screws 61. As in the case of first actuator 34, any suitable duct means, not shown, may be employed to connect second actuator 59 to a source of pressurized fluid, also not shown, and adjust the throw of rods 43 and 58.

Clinching arms 17–20 are shown in FIGS. 1 through 5 as being of identical construction and as being pivotally mounted adjacent the lower ends thereof on support block 16 by four horizontally disposed mutually perpendicular pivot shafts 62, 63, 64, and 65, which are carried on support block pivot supports 26–29. Each of the clinching arms is in the form of a flat metallic plate having an inwardly facing stepped surface including planar portions 66, 67, relatively inclined cam follower portion 68, and sharp edge portion 69, which is defined by relatively inclined surfaces 70, 71. The outwardly facing surface 72 of each clinching ram is provided with a transversely extending groove 73. The clinching arms are normally biased into engagement with the upper end of actuating rod 21, as viewed in FIGS. 4 and 5 by means of resilient O-ring band 74 which is received within each of the clinching arm grooves 73, as best shown in FIG. 3.

By again referring to FIG. 3, it will be apparent that the axes of the pivot shafts 62–65 are spaced equi-distance from the axis of reciprocation of actuating rod 21, and that upon movement of the actuating rod with respect to the clinching arms in the manner illustrated in FIGS. 4 and 5, the component lead deforming and guiding surfaces, generally indicated at 75, 76, 77 and 78, which are disposed adjacent the upper ends of the clinching arms, are caused to be simultaneously pivoted apart against the bias of band 74 along lines radiating from the axis of rod 21.

Figure 8:
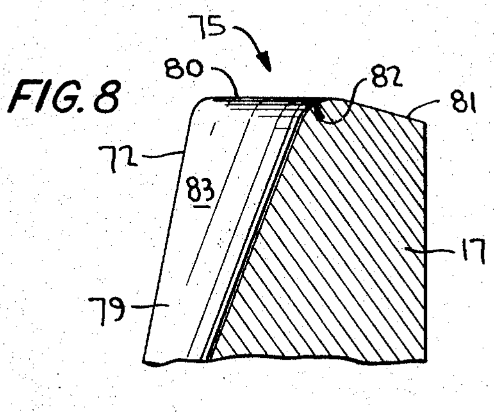
FIG. 8 is an enlarged fragmentary view taken along line 8—8 in FIG. 3.

The design of the deforming and guiding surfaces of the clinching arms may be best described with reference to surface 75 of clinching arm 17 shown in FIGS. 3 and 8. Surface 75 is generally defined by the walls of a groove or notch indicated generally at 79, which is cut into the outwardly facing surface 72 and upper end surface 80 of arm 17, and upper end surface portion 81 which is slightly inclined, e.g. approximately 15° with respect to upper end surface 80. In FIGS. 3 and 8 the upper end of groove 79 is shown as being progressively reduced in width and depth and fared into inclined upper end surface portion 81 by turning the bottom of groove 79 through a small radius, as indicated at 82, the groove or notch 79 is vertically oriented as can be seen in FIGURES 3, 5, 6 and 8.

Figure 7:
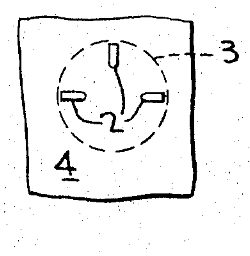
FIG. 7 is a view taken generally along the line 7—7 in FIG. 5.

It will be understood that when the clinching device is employed for processing short lead components, the walls of groove or notch 79 merely serve to guide and align component lead 2, if deformed, when clinching arm 17 is reciprocated upwardly from its initial position illustrated in FIG. 1 into that illustrated in FIG. 4, thereby avoiding any tendency of the clinching arms to injure the leads, to push the leads upwardly through the circuit board or to exert pressure on the circuit board. When processing long lead components the ends of the lead would be slidably engaged by the wall surfaces of grooves or notches 79, so as to progressively bend the leads to an inclined position parallel to the bottom surfaces of the grooves or notches. Upon pivotable movement of clinching arm 17 into the position illustrated in FIG. 5, groove or notch side walls 83 serve to progressively constrain lead 2 to a plane disposed perpendicular to the axis of clinching arm pivot shaft 62, and the bottom surface of groove or notch 79, indicated at 82, engages the component lead progressively upward along the length thereof so as to progressively form a right angle bend in the lead, whereafter inclined upper end surface portion 81 wipes the under surface of the deformed lead adjacent to the right angle bend thereof to positively clinch the lead into engagement with the circuit board, as indicated in FIG. 7. Preferably, upon completion of pivotable movement of clinching arm 17, inclined upper end surface portion 81 lies substantially parallel with the under surface of the circuit board. From the foregoing it will be apparent that upon pivotable movement of the clinching arms, the leads are progressively bent from the position illustrated in FIG. 6 to that shown in FIG. 7 without possibly injurious contact between the crimping arms and the circuit board and without there being exerted excessive bending stress in the leads.

The clinching arm arrangement described is adapted to be employed in clinching the leads of two, three or four lead components. However, it will be apparent that clinching unit 6 may be modified to support any desired number of clinching arms.

In operation of the clinching device of the present invention, suitable means, not shown, are first employed to insert the leads of a component downwardly through circuit board 4 with the clinching device disposed in its initial or rest position illustrated in FIG. 1. Preferably the component lead inserting means is adapted to maintain the component body portion 3 in engagement with the upper surface of the circuit board during the clinching operation which follows, although only slight component seating pressure is necessary when short leads are to be crimped. Thereafter, a suitable control means, not shown, is employed to supply fluid under pressure to fluid actuator 34, whereby actuator pin 41 is forced to the right, as viewed in FIG. 1, to effect pivotable movement of bell crank 35 about the axis of pin 36 in the direction indicated by arrow 84 and thus vertical movement of clinching unit 6 in the direction indicated by arrow 85 to the position illustrated in FIG. 4. Upward movement of the clinching arms serves merely to position short component leads 2 within respective grooves or notches 79 of clinching arms 17–20.

Immediately thereafter pressurized fluid is admitted to second fluid actuator 59, whereby forcing piston rod 58 upwardly into engagement with base portion 52 of actuating rod 21, so as to move the actuating rod against the bias of spring 56 from position illustrated in FIG. 4 to that illustrated in FIG. 5. Upon relative vertical movement of actuating rod 21, rod end portion 51 engages cam follower surface 68, whereby pivoting the clinching arms apart against the bias of band 74 to effect clinching of component leads 2 against the under surface of the circuit board as illustrated in FIGS. 5 and 7.

Thereafter in sequence fluid actuator 59 is de-energized to permit spring 56 and band 74 to return the actuating rod and the clinching arms, respectively, to their positions illustrated in FIG. 4, and fluid pressure actuator 34 is de-energized to return the clinching unit to its initial position, illustrated in FIG. 1, to complete the clinching cycle.

Although one particular embodiment of the present invention has been described in detail, various modifications thereof will appear to those skilled in the art in view of the present disclosure and therefore the scope of this invention is to be limited only by the appended claims.

What is claimed is:

1. In an electrical component lead bending and clinching device, support means; at least two component lead clinching arms pivotably mounted on said support and adapted to be maintained in a first pivotable position; an arm pivoting rod extending through said support; means for yieldably interconnecting said rod and said support; means responsive to a first actuator means for reciprocating said interconnected support and rod, and means responsive to a second actuator means for reciprocating said rod with respect to said support and said arms to pivot said arms into a lead clinching position, said two arms including top surfaces and side surfaces facing outwardly from said rod and a vertically oriented substantially V-shaped notch intersecting both of said surfaces.

2. The bending and clinching device according to claim 1, wherein said two arms are mounted for pivotable movement about spaced parallel axes disposed perpendicular to and equidistance from the axis of reciprocation of said rod, said two arms including radially inwardly facing first surface portions and follower portions, and resilient means are provided to maintain said arms in said first position with said first surface portions in engagement with said rod, said follower portions cooperating with said rod upon reciprocation thereof to pivot said arms into clinching position.

3. The bending and clinching device according to claim 2, wherein two additional arms are provided having opposed first surface portions and follower portions, said additional arms being mounted for pivotable movement about spaced parallel axes disposed mutually perpendicular and in a plane common to the first said axes, the distance between each of said pivot axes and said axis of reciprocation being equal, and said resilient means comprises a resilient band arranged about said arms in engagement with radially outwardly facing surfaces thereof.

4. The bending and clinching device according to claim 3, wherein said outwardly facing surfaces are slotted and said band is received within each of said slots.

5. The bending and clinching device according to claim 3, wherein said rod includes a frusto conical upper end portion adapted to cooperate with said follower portions to pivot said arms into clinching position.

6. In an electrical component lead bending and clinching device, support means; at least two component lead clinching arms pivotably mounted on said support and adapted to be maintained in a first pivotable position; an arm pivoting rod extending through said support; means for yieldably interconnecting said rod and said support; means responsive to a first actuator means for reciprocating said interconnected support and rod, and means responsive to a second actuator means for reciprocating said rod with respect to said support and said arms to pivot said arms into a lead clinching position, each said arm is in the form of a plate mounted for pivotable movement in a plane radially of the axis of reciprocation of said rod, said plate having a lead receiving groove cut into a radially outwardly facing edge surface and upper end surface of said plate and a second relatively radially inwardly disposed upper end surface portion, said groove being progressively reduced in width and depth toward the upwardly extending end thereof, and said groove having a bottom surface portion turned through a small radius and fared into said second end surface portion adjacent said upwardly extending end.

7. The bending and clinching device according to claim 6, which includes four clinching arms mounted for pivotable movement about four mutually perpendicular axes arranged in a common plane, the distance between each of said pivot axes and said axis of reciprocation being equal, each said arm plate includes radially inwardly facing first surface portions and follower portions, said rod is cylindrical and provided with a frusto-conical upper end portion, and a resilient O-ring band disposed about said arm plates in engagement with the radially outwardly facing edge surfaces thereof is provided to maintain said arms in said first position with said first surface portions in engagement with said cylindrical portion of said rod, and said follower portions cooperating with said frusto-conical rod end portion upon reciprocation thereof to pivot said arm into clinching position against the bias of said band.

8. An electrical component handling device for bending and clinching the leads of components to a board, each component having a body section and series of parallel wire leads extending outwardly from a side thereof, the body section of a component residing on a first face of said board with each of the leads to be bent and clinched extending through the board perpendicular thereto, and outwardly of a second face of said board; at least two clinching arms having substantially V-shaped and vertically oriented component lead guiding means, said means adapted to engage said leads upon upward movement thereof, and deforming surfaces adjacent one end of said guiding means and adapted to wipe said leads across the second face of said board in a plane disposed perpendicular to the pivot axis of said arm; means for pivotably supporting said arms at a point spaced from said one end; means tending to maintain said arm surfaces in a first position; means adapted to move said arm supporting means towards said second face of said board to position said arm surfaces adjacent said outwardly extending leads; and means adapted to pivot said arms to force said arm surfaces into lead clinching position.

9. The device of claim 8, which includes four clinching arms mounted for pivotable movement about four mutually perpendicular axes arranged in a common plane, the distance between each of said axes and a line drawn normal to said plane being equal, each of said arms is in the form of a plate mounted for movement in a plane radially of said line, said lead guiding means being defined by a notch cut into a radially outwardly facing edge surface and upper end surface of said plate and second relatively radially inwardly disposed upper end surface portion of said plate, said notch being progressively reduced in width and depth toward the upwardly extending end thereof, and said notch having a bottom surface portion turned through a small radius and fared into said second end surface portion adjacent said upwardly extending end.

References Cited

UNITED STATES PATENTS

| | | | |
|---|---|---|---|
| 2,827,634 | 3/1958 | Kwasniewski | 29—203 |
| 2,829,371 | 4/1958 | Sittner et al. | 29—203 |
| 2,867,810 | 1/1959 | Gagnon | 29—203 |
| 2,893,010 | 7/1959 | Stuhre | 29—203 |
| 2,902,689 | 9/1959 | Petersen | 29—203 |
| 2,907,040 | 10/1959 | Woods | 29—203 |
| 3,167,779 | 7/1965 | Ahearn | 29—203 |

CHARLES W. LANHAM, *Primary Examiner.*

E. M. COMBS, *Assistant Examiner.*

U.S. Cl. X.R.

29—203